(12) United States Patent
Gautier et al.

(10) Patent No.: US 6,203,236 B1
(45) Date of Patent: Mar. 20, 2001

(54) QUICK ASSEMBLING AND DISASSEMBLING DEVICE

(75) Inventors: Jean-Pierre Gautier, Aulnay-SS-Bois; Cedric Leboisne, Paris; Frederic Antherieu, Fontenay-SS-Bois, all of (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/297,965
(22) PCT Filed: Apr. 15, 1999
(86) PCT No.: PCT/FR99/00883
  § 371 Date: May 11, 1999
  § 102(e) Date: May 11, 1999
(87) PCT Pub. No.: WO99/56025
  PCT Pub. Date: Nov. 4, 1999

(30) Foreign Application Priority Data

Apr. 24, 1998 (FR) .................................................. 98 05115

(51) Int. Cl.[7] ...................................................... B25G 3/18
(52) U.S. Cl. .................. 403/322.1; 74/512; 403/321; 403/196
(58) Field of Search ............................. 403/49, 321, 256, 403/261, 181, 187, 196; 74/512, 502.6

(56) References Cited

U.S. PATENT DOCUMENTS 1,352,982 * 9/1920 Luthi .
3,646,831 * 3/1972 Janosi .
3,988,945 * 11/1976 Fasano .
5,054,333 * 10/1991 Scott et al. .

FOREIGN PATENT DOCUMENTS

1044762 * 10/1966 (GB) .
1403884 * 8/1975 (GB) .

* cited by examiner

Primary Examiner—Lynne H. Browne
Assistant Examiner—Tomlyne A Malcolm
(74) Attorney, Agent, or Firm—Leo H McCormick, Jr.; Warren Comstock

(57) ABSTRACT

A device for the quick assembly and disassembly of an input rod (1) for operating a brake system and a brake pedal. A clasp (3) is secured to the input rod (1) connecting a spindle (4) fixed to the brake pedal. The clasp (3) has a guide yoke (31) which receives a retaining yoke (32) and blocking members (51,61) which maintain the retaining yoke (32) in a closed configuration with respect to the guide yoke (31). The blocking member comprise at least one lug (51) borne by the retaining yoke (32) which projects toward the guide yoke (31) and opening (61) in the guide yoke (31) which receives the lug (51) with the clasp (3) in moved to a closed configuration. On movement of the clasp (3) toward a closed configuration, parallel cheeks (325,326) of retaining yoke (31) which are squeezed together elastically expand when lug (51) enters opening (61) to lock the clasp (3) in the closed configuration.

6 Claims, 3 Drawing Sheets

QUICK ASSEMBLING AND DISASSEMBLING DEVICE

The present invention relates to a device for the quick assembly and disassembly of two parts.

More specifically, the invention relates to a device of the type comprising a clasp secured to a first of the two parts and a fastener secured to a second of the two parts and arranged transversely with respect to a first direction, the clasp comprising a guide yoke which has a guide slot oriented in the first direction, a retaining yoke having a retaining slot, and blocking means, the retaining yoke being mounted so that it can be pivoted at will on the guide yoke, the fastener being able, when the clasp is in an open configuration, to enter the guide and retaining slots simultaneously, in a movement in the first direction and towards a closed end of the guide slot, insertion of the fastener into the clasp causing the retaining yoke to pivot between an unlocked position which corresponds to the clasp-open configuration and for which the retaining slot is oriented at an angle to the first direction, and a locked position which corresponds to a clasp-closed configuration and for which the retaining slot is oriented transversely with respect to the first direction, the blocking means spontaneously allowing the clasp to pass from its open configuration to its closed configuration and allowing passage in the opposite direction only selectively.

BACKGROUND OF THE INVENTION

Devices of this type are well known in the prior art, as illustrated, for example, by Patent GB-1, 044,762.

In general, these devices are used for highly specific applications, and in products whose use is not particularly widespread, which means that they can, without any economic disadvantage, be highly complex.

SUMMARY OF THE INVENTION

The invention, on the other hand, envisages adapting a device of this type to applications that demand mass production, and therefore has the objective of optimizing the structure of such a device to make it easy and inexpensive to manufacture, the invention finding a favourite application in the assembly of braking force transmission systems for motor vehicles.

To this end, the device of the invention, which in other respects is in accordance with the definition given in the above preamble, is essentially characterized in that the blocking means comprise at least a first lug borne by a first of the two yokes and projecting towards a second of these yokes, and at least one corresponding housing provided in the second yoke for housing the first lug, a lack of engagement of the first lug in the corresponding housing causing, in the case of one of the two yokes at least, an elastic deformation which is taken back up by the engagement of this first lug in the corresponding housing, and in that the first lug is engaged in the corresponding housing for the clasp-closed configuration and only for this configuration.

As a preference, the retaining yoke is mounted to pivot about a pivot supported by the guide yoke, and this yoke comprises first and second cheeks which are parallel and joined together, the first lug and the corresponding housing being provided on cheeks which face each other belonging to the two yokes.

In this case, the retaining yoke is advantageously mounted inside the guide yoke and the cheeks of the retaining yoke have legs which extend beyond the guide yoke in the clasp-closed configuration, it thus being possible for the cheeks of the retaining yoke to be moved closer together by squeezing, in order to allow each lug to disengage from the corresponding housing.

Furthermore, the retaining yoke may have an elastic tongue which is arranged between the first and second cheeks of the retaining yoke, at right angles to these cheeks and which, in the clasp-closed configuration, elastically urges the fastener towards the closed end of the guide slot.

The effectiveness of the device of the invention is further enhanced by giving the first lug a sloping profile ending in an abrupt edge and by ensuring that the abrupt edge is last to enter the housing when the first lug is engaged in the corresponding housing through the rotation of the retaining yoke from its unlocked position into its locked position.

In the favourite application of the invention, the first part is a rod for operating a braking system, and the second part is a brake pedal, the operating rod extending in the first direction, and the fastener consisting of a spindle fixed to the brake pedal.

Other features and advantages of the invention will emerge clearly from the description thereof given hereafter by way of non-limiting indication with reference to the appended drawings,.

Figure 1:
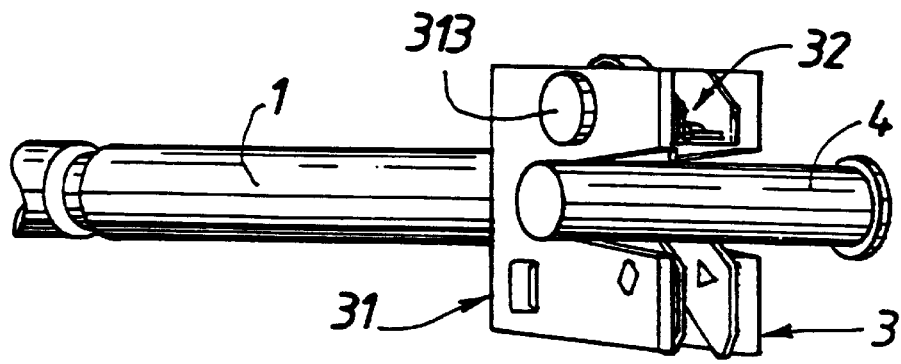
FIG. 1 is a three-quarters rear perspective view of a device in accordance with the invention, prior to assembly.
Figure 2:
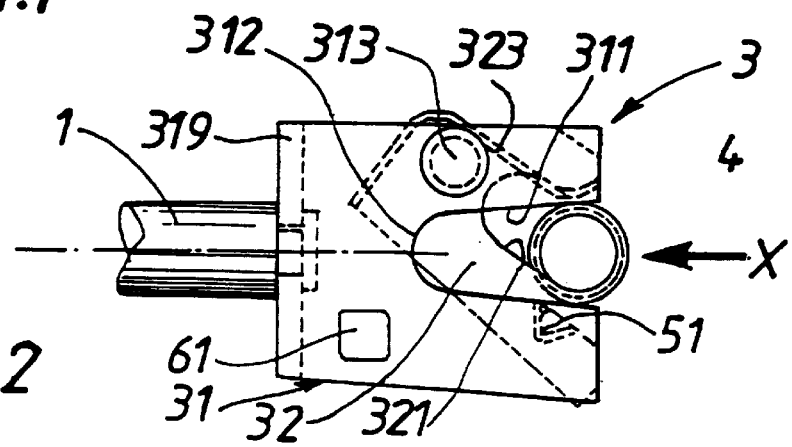
FIG. 2 is a side view of the device of FIG. 1.
Figure 3:
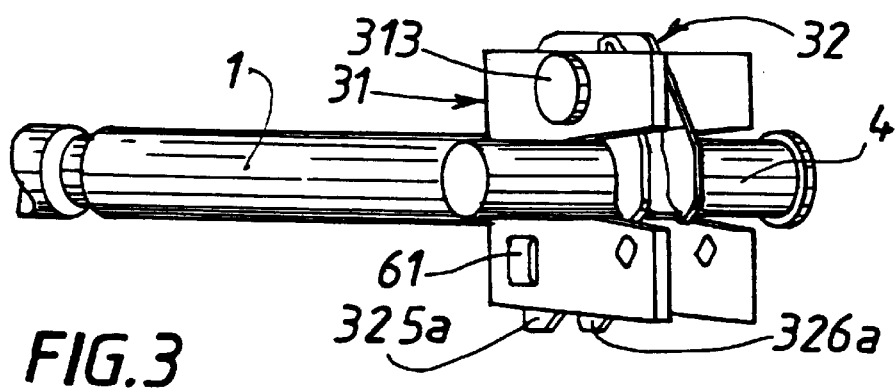
FIG. 3 is a three-quarters rear perspective view of a device in accordance with the invention, after assembly.

As mentioned earlier, the invention relates to a device allowing the quick assembly and disassembly of two parts 1 and 2, this device comprising, in a way known per se, a clasp 3 secured to the first part 1 and a fastener 4 secured to the second part 2, the fastener 4 itself essentially consisting of a guide yoke 31, a retaining yoke 32 and additional members such as 51, 61, 52, 62 and 323 which are more specifically the subject of the present invention.

The clasp 3 can selectively adopt an open configuration illustrated in FIGS. 1, 2, 5 and 9, in which it does not retain the fastener 4, and a closed configuration illustrated in FIGS. 3, 4, 6 and 10, in which it keeps the fastener 4 captive.

Passage from the open configuration to the closed configuration is obtained by inserting the fastener 4 into the clasp 3 in an assembly direction X (see FIGS. 2 and 9), the fastener 4 being arranged transversely with respect to this direction X and adopting, for example, the form of a spindle fixed to a brake pedal, the latter constituting the second part 2 to be assembled.

The guide yoke 31 has a guide slot 311 oriented in the direction X, the retaining yoke 32 itself having a retaining slot 321 and being mounted so that it can be pivoted at will on the guide yoke 31, about a pivot 313 supported by this guide yoke 31.

In the clasp-open configuration, the retaining slot 321 is oriented at an angle to the direction of assembly X (FIG. 2), while at the same time allowing the fastener 4 to be inserted into the guide and retaining slots 311 and 321 simultaneously through a movement in the assembly direction X towards the closed end 312 of the guide slot 31 [sic].

Figure 4:
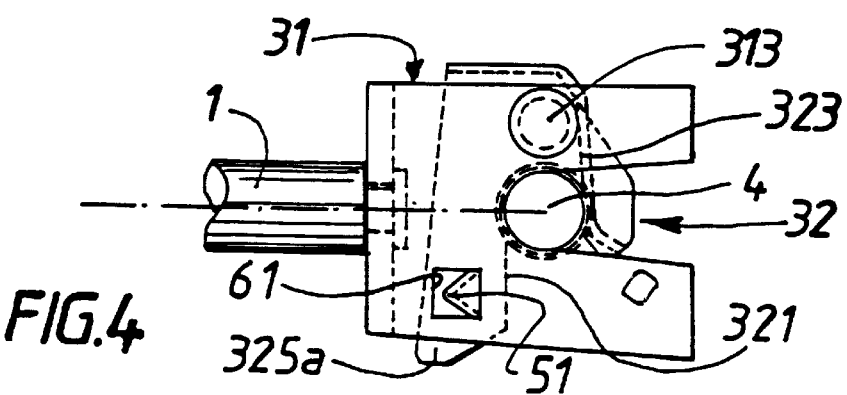
FIG. 4 is a side view of the device of FIG. 3.
Figure 5:
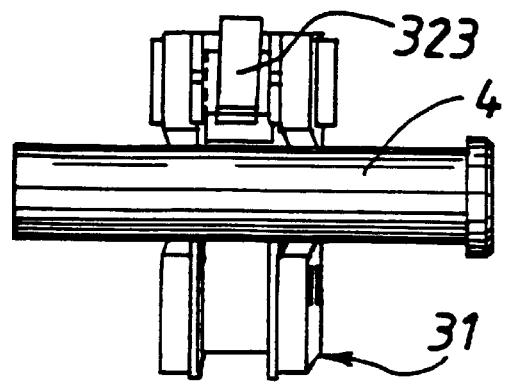
FIG. 5 is a rear view of the device of FIGS. 1 and 2.
Figure 6:
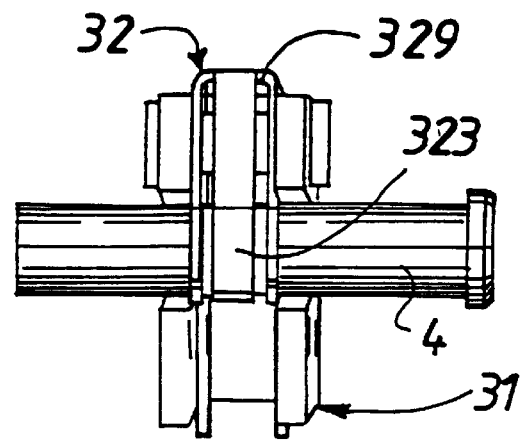
FIG. 6 is a rear view of the device of FIGS. 3 and 4.
Figure 7:
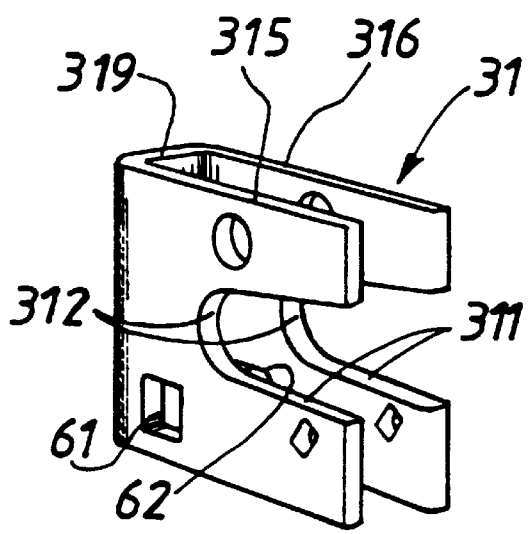
FIG. 7 is a perspective view of the guide yoke.

Because the retaining slot 321 is oriented at an angle in the clasp-open configuration, insertion of the fastener 4 into the clasp 3 causes the retaining yoke 32 to pivot from an unlocked position which corresponds to the clasp-open configuration into a locked position which corresponds to a clasp-closed configuration and for which the retaining slot 321 is oriented transversely with respect to the assembly direction X (see FIG. 4).

Blocking members such as 51, 61, 52 and 62 are also provided, so as to allow the clasp 3 to pass from its open configuration to its closed configuration and to prevent passage in the opposite direction, at least unless a special manipulation is performed.

According to the invention, these blocking a members essentially comprise at least one lug such as 51 or 52 borne by one of the two yokes, for example the retaining yoke 32, and projecting towards the other yoke, in this instance the guide yoke 31, and at least one corresponding housing such as 61 or 62 provided on this other yoke, in this instance 31, for housing the lug 51 or 52 to which this housing corresponds.

Furthermore, as FIG. 4 shows, the lug 51, and more generally each lug 51, 52, is engaged in the corresponding housing 61, 62 in the clasp-closed configuration.

Now, the yokes 31, 32 and the lug 51 are dimensioned in such a way that the fact that a lug 51 or 52 is not engaged in the corresponding housing 61 or 62 causes, for at least one of the two yokes 31, 32, an elastic deformation which can only be taken back up by the engagement of this lug 51, 52 in the corresponding housing 61, 62.

By virtue of these features, the clasp 3 is therefore in a state of minimal stressing when it is in its closed configuration, which gives this configuration the stability needed to prevent the clasp from spontaneously passing from its closed configuration to its open configuration.

Each yoke 31, 32 comprises, for example, two cheeks 315, 316 and 325, 326 which are parallel and joined together by a bridge 319, 329, and each lug 51, 52 together with the corresponding housing 61, 62 are provided on cheeks 315, 325 and 316, 326 which face each other belonging to the two yokes 31, 32.

The retaining yoke 32 is advantageously made of an elastic material, for example a spring steel, and mounted inside the guide yoke 31.

This being the case, the retaining yoke 32 is subjected to an elastic stress which causes its cheeks 325, 326 to move closer together for as long as the lugs 51, 52 are not engaged in the housings 61, 62, that is to say for as long as the clasp is not in its closed configuration.

The cheeks 325, 326 of the retaining yoke 32 preferably have legs 325a, 326a which extend beyond the guide yoke 31 in the clasp-closed configuration, it thus being possible for the cheeks 325, 326 of the retaining yoke 32 to be moved closer together by squeezing, in order to allow each lug 51, 52 to disengage from the corresponding housing 61, 62.

The retaining yoke 32 may furthermore comprise an elastic tongue 323 which is arranged between the cheeks 325, 326 of this yoke 32, at right angles to the cheeks 325, 326 and which, in the clasp-closed configuration, elastically urges the fastener towards the closed end 312 of the guide slot 311 until it makes this fastener touch this closed end or wedges it in the guide slot.

Figure 8:
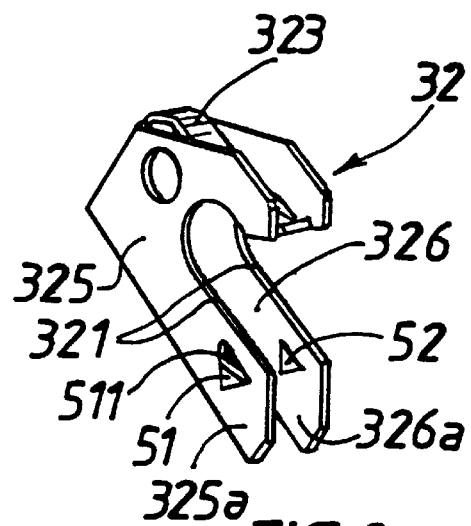
FIG. 8 is a perspective view of the retaining yoke.

As best shown in FIG. 8, each lug 51, 52 preferably has a sloping profile ending in an abrupt edge such as 511, and this edge 511 is last to enter the corresponding housing 61 when this lug 51 is engaged in this housing 61 through the rotation of the retaining yoke 32 from its unlocked position into its locked position.

Figure 9:
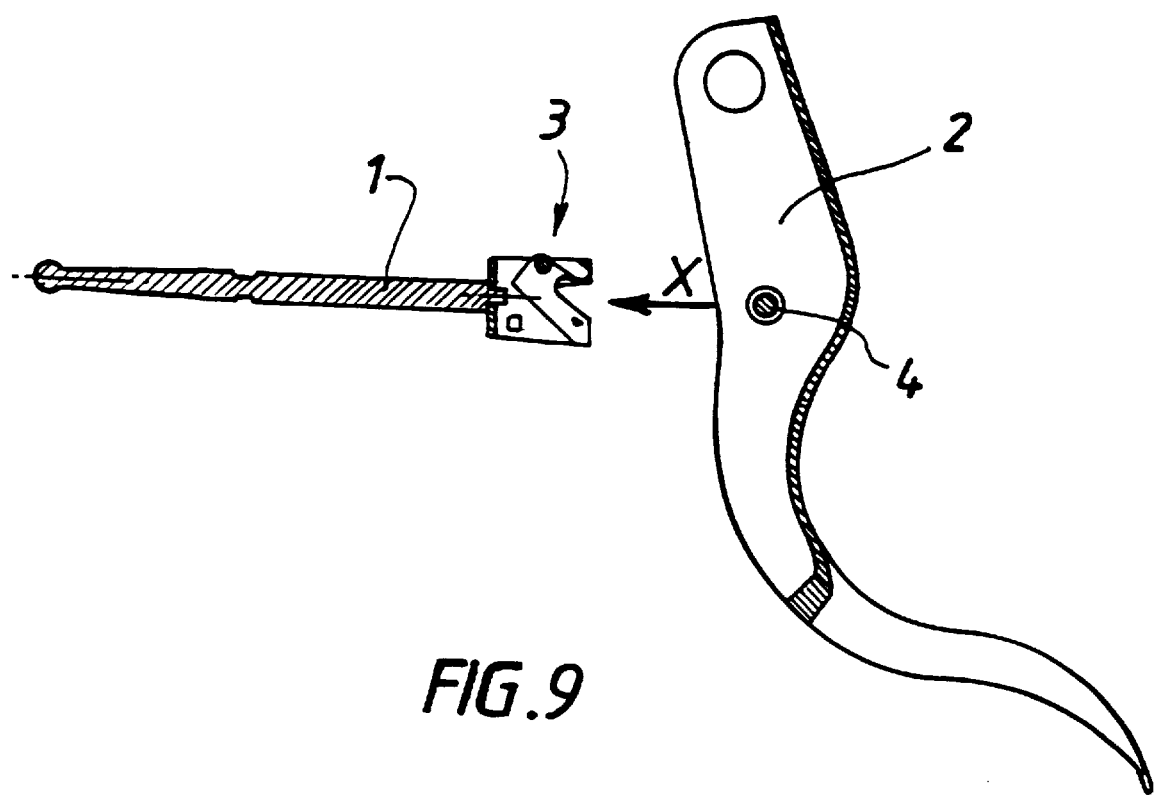
FIG. 9 is a partial sectional view of a brake force transmission system using a device in accordance with the invention, prior to assembly.
Figure 10:
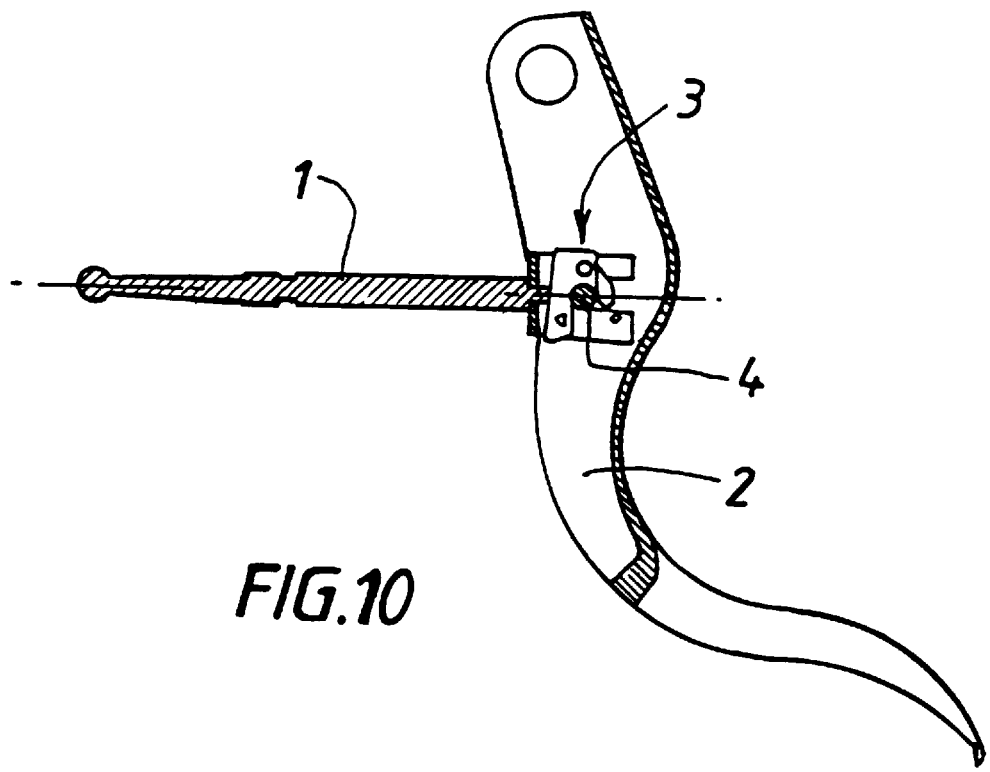
FIG. 10 is a partial sectional view of a braking force transmission system, using a device in accordance with the invention, after assembly.

In its favourite application, illustrated in FIGS. 9 and 10, the device of the invention allows the operating rod of a braking system, which constitutes the first part 1 to be assembled, and which extends in the assembly direction X, to be assembled quickly with a brake pedal, which constitutes the second part 2 to be assembled, the fastener 4 adopting the form of a transverse spindle fixed to the brake pedal.

What is claimed is:

1. A device for the quick assembly and disassembly of two parts, comprising:

a clasp adapted to be secured to a first of said two parts, said clasp comprising a guide yoke with a guide slot oriented in a first direction, a retaining yoke having a retaining slot, and blocking means, said retaining yoke being mounted so that it can be pivoted at will on said guide yoke; and a fastener adapted to be secured to a second of said two parts and arranged transversely with respect to said first direction, said fastener simultaneously entering said guide and retaining slots when said clasp is in an open configuration by initial movement in the first direction towards a closed end of said guide slot and with further movement of the fastener into the clasp causing said retaining yoke to pivot between an unlocked position which corresponds to a clasp-open configuration in which said retaining slot is oriented at an angle to said first direction to a locked position which corresponds to a clasp-closed configuration in which said retaining slot is oriented transversely with respect to said first direction, said blocking means spontaneously allowing said clasp to pass from said open configuration to said closed configuration while selectively allowing passage of said clasp from said closed configuration to said open configuration, characterized in that said blocking means comprise at least a first lug borne by a first of said two yokes and projecting towards a second of said two yokes, and at least one corresponding housing located in said second of said two yokes for housing said first lug, a lack of engagement of the first lug in the corresponding housing causing an elastic deformation in at least one of said two yokes, said elastic deformation being taken back upon the engagement of said first lug in said corresponding housing, said first lug being engaged in said corresponding housing only in said clasp-closed configuration, said retaining yoke being mounted to pivot about a pivot supported by said guide yoke, said guide yoke comprises first and second parallel cheeks which are joined together, and said first lug and said corresponding housing are located on said cheeks which face each other and are part of said two yokes, said retaining yoke being mounted inside of said guide yoke and said cheeks of said retaining yoke having legs which extend beyond said guide yoke in said clasp-closed configuration, said cheeks of said retaining yoke moving closer together by squeezing in order that each lug may be disengage from said corresponding housing.

2. The device as recited in claim 1 wherein said retaining yoke includes an elastic tongue which is arranged between the first and second cheeks of said retaining yoke and located at right angle to said first and second cheeks, said elastic tongue, in the clasp-closed configuration, elastically urges said fastener towards the closed end of said guide slot.

3. A device for the quick assembly and disassembly of two parts, comprising:
   a clasp adapted to be secured to a first of said two parts, said clasp comprising a guide yoke with a guide slot oriented in a first direction, a retaining yoke having a retaining slot, and blocking means, said retaining yoke being mounted so that it can be pivoted at will on said guide yoke; and
   a fastener adapted to be secured to a second of said two parts and arranged transversely with respect to said first direction, said fastener simultaneously entering said guide and retaining slots when said clasp is in an open configuration by initial movement in the first direction towards a closed end of said guide slot and with further movement of the fastener into the clasp causing said retaining yoke to pivot between an unlocked position which corresponds to a clasp-open configuration in which said retaining slot is oriented at an angle to said first direction to a locked position which corresponds to a clasp-closed configuration in which said retaining slot is oriented transversely with respect to said first direction, said blocking means spontaneously allowing said clasp to pass from said open configuration to said closed configuration while selectively allowing passage of said clasp from said closed configuration to said open configuration, characterized in that said blocking means comprise at least a first lug borne by a first of said two yokes and projecting towards a second of said two yokes, and at least one corresponding housing located in said second of said two yokes for housing said first lug, a lack of engagement of the first lug in the corresponding housing causing an elastic deformation in at least one of said two yokes, said elastic deformation being taken back upon the engagement of said first lug in said corresponding housing, said first lug being engaged in said corresponding housing only in said clasp-closed configuration, said retaining yoke being mounted to pivot about a pivot supported by said guide yoke, said guide yoke comprises first and second parallel cheeks which are joined together, and said first lug and said corresponding housing are located on said cheeks which face each other and are part of said two yokes, said retaining yoke being mounted inside of said guide yoke and said cheeks of said retaining yoke having legs which extend beyond said guide yoke in said clasp-closed configuration, said cheeks of said retaining yoke moving closer together by squeezing in order that each lug may be disengage from said corresponding housing, said retaining yoke having an elastic tongue which is arranged between said first and second cheeks of said retaining yoke, said elastic tongue being at right angles to said first and second cheeks, said elastic tongue elastically urging said fastener towards said closed end of said guide slot in said clasp-closed configuration.

4. The device as recited in claim 3, characterised in that said first lug has a sloping profile ending in an abrupt edge, said abrupt edge being the last to enter said housing when the first lug is engaged in the corresponding housing through the rotation of said retaining yoke from and unlocked position into a locked position.

5. A device for the quick assembly and disassembly of two parts, comprising:
   a clasp adapted to be secured to a first of said two parts, said clasp comprising a guide yoke with a guide slot oriented in a first direction, a retaining yoke having a retaining slot, and blocking means, said retaining yoke being mounted so that it can be pivoted at will on said guide yoke; and
   a fastener adapted to be secured to a second of said two parts and arranged transversely with respect to said first direction, said fastener simultaneously entering said guide and retaining slots when said clasp is in an open configuration by initial movement in the first direction towards a closed end of said guide slot and with further movement of the fastener into the clasp causing said retaining yoke to pivot between an unlocked position which corresponds to a clasp-open configuration in which said retaining slot is oriented at an angle to said first direction to a locked position which corresponds to a clasp-closed configuration in which said retaining slot is oriented transversely with respect to said first direction, said blocking means spontaneously allowing said clasp to pass from said open configuration to said closed configuration while selectively allowing passage of said clasp from said closed configuration to said open configuration, characterized in that said blocking means comprise at least a first lug borne by a first of said two yokes and projecting towards a second of said two yokes, and at least one corresponding housing located in said second of said two yokes for housing said first lug, a lack of engagement of the first lug in the corresponding housing causing an elastic deformation in at least one of said two yokes, said elastic deformation being taken back upon the engagement of said first lug in said corresponding housing, said first lug being engaged in said corresponding housing only in said clasp-closed configuration, said retaining yoke being mounted to pivot about a pivot supported by said guide yoke, said guide yoke comprises first and second parallel cheeks which are joined together, and said first lug and said corresponding housing are located on said cheeks which face each other and are part of said two yokes, said retaining yoke being mounted inside of said guide yoke and said cheeks of said retaining yoke having legs which extend beyond said guide yoke in said clasp-closed configuration, said cheeks of said retaining yoke moving closer together by squeezing in order that each lug may be disengage from said corresponding housing, said first lug having a sloping profile which ends in an abrupt edge, said abrupt edge being the last to enter said housing when said first lug is engaged in said corresponding housing through the rotation of said retaining yoke from a unlocked position into a locked position.

6. In combination device for the quick assembly and disassembly of a rod which operates a braking system and a brake pedal, the combination comprising:
   a clasp secured to said rod, said clasp comprising a guide yoke with a guide slot oriented in a first direction, a retaining yoke having a retaining slot, said retaining yoke being mounted so that it can be pivoted at will on said guide yoke;
   a fastener including a spindle fixed to the brake pedal and arranged transversely with respect to said first direction, said spindle simultaneously entering said guide and retaining slots when said clasp is in an open configuration by initial movement in the first direction towards a closed end of said guide slot and with further movement of the spindle into the clasp causing said retaining yoke to pivot between an unlocked position which corresponds to a clasp-open configuration in which said retaining slot is oriented at an angle to said first direction to a locked position which corresponds to a clasp-closed configuration in which said retaining slot is oriented transversely with respect to said first direction; and blocking means for spontaneously allowing said clasp to pass from said open configuration to said closed configuration while selectively allowing release of said clasp from said closed configuration to said open configuration, characterized in that said blocking means comprise at least a first lug borne by a first of said guide and retaining yokes and projecting towards a second of said guide and retaining yokes, and at least one corresponding housing located in said second of said guide and retaining yokes for housing said first lug, a lack of engagement of the first lug in the corresponding housing causing an elastic deformation in at least one of said guide and retaining yokes, said elastic deformation being taken back upon the engagement of said first lug in said corresponding housing, said first lug being engaged in said corresponding housing only in said clasp-closed configuration, said retaining yoke being mounted to pivot about a pivot supported by said guide yoke, said guide yoke comprises first and second parallel cheeks which are joined together, and said first lug and said corresponding housing are located on cheeks which face each other and are part of said two yokes, said retaining yoke being mounted inside of said guide yoke and said cheeks of said retaining yoke having legs which extend beyond said guide yoke in said clasp-closed configuration, said cheeks of said retaining yoke moving closer together by squeezing in order that each lug may be disengage from said corresponding housing.

* * * * *